(No Model.)

F. W. BRADLEY.
FRUIT PULPER.

No. 343,754. Patented June 15, 1886.

WITNESSES:
C. Neveux
C. Sedgwick

INVENTOR:
F. W. Bradley
BY Munn & Co.
ATTORNEYS.

UNITED STATES PATENT OFFICE.

FRANK W. BRADLEY, OF DENVER, COLORADO.

FRUIT-PULPER.

SPECIFICATION forming part of Letters Patent No. 343,754, dated June 15, 1886.

Application filed February 24, 1886. Serial No. 193,013. (No model.)

*To all whom it may concern:*

Be it known that I, FRANK W. BRADLEY, of Denver, in the county of Arapahoe and State of Colorado, have invented a new and useful Improvement in Fruit-Pulpers, of which the following is a specification, reference being had to the annexed drawings, forming a part thereof, in which—

Figure 1:
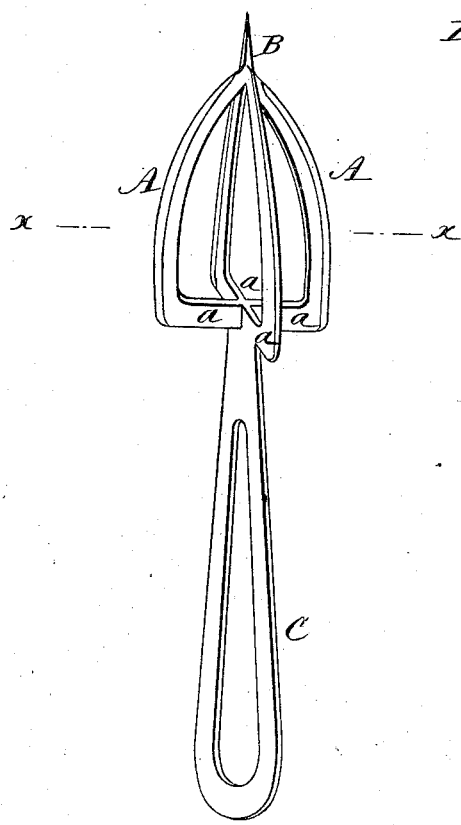
Figure 2:
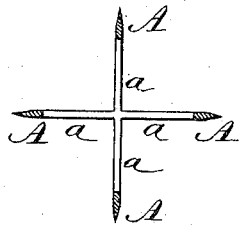

Figure 1 is a perspective view of my improved fruit-pulper. Fig. 2 is a transverse section taken on line $x$ $x$ in Fig. 1.

Similar letters of reference indicate corresponding parts in both figures of the drawings.

The object of my invention is to provide a simple and efficient implement for easily removing the pulp from lemons, oranges, and similar fruit.

My invention consists in the construction and arrangement of parts, as will be hereinafter described and claimed. The curved blades A are connected together and with a point, B, at one end, and the blades at their opposites ends are connected by arms $a$ with the handle C. The curvature of the blades A is approximately the same as that of the inner surface of the peel of a lemon or orange, so that when the pulper is inserted in the pulp of one half of a lemon or orange and turned it will remove the pulp from the peel, so that it may be used without being flavored with the oil of the peel.

The blades may be made detachable from the handle, if desirable. The point B assists the blades in entering and keeps the implement centered properly in the lemon as it penetrates the tough end portion thereof.

I am aware that a lemon-squeezer has been formed of a handle terminating in a grooved bulb, forming a series of radial blades, which are rounded and converge at their outer ends; also, that a handle has been provided with a circular series of straight wires, which converge at their outer ends, thus forming a cone, and I do not claim the same as of my invention.

Having thus described my invention, what I claim as new, and desire to secure by Letters Patent, is—

As an improved article of manufacture, a fruit-pulper consisting of the handle C, having a series of arms, $a$, radiating outward from one end, a series of curved skeleton blades, A, converging at their upper ends and connected at their lower ends to the outer ends of arms $a$, and a penetrating-point, B, projecting beyond the converging ends of the blades, substantially as set forth.

FRANK W. BRADLEY.

Witnesses:
 H. E. PECK,
 J. S. FLOWER.